Aug. 26, 1924.

E. E. HEINTZ

CLUTCH

Original Filed April 27, 1921    2 Sheets-Sheet 1

Inventor
Ernest E. Heintz

By Stuart C. Barnes
Attorney

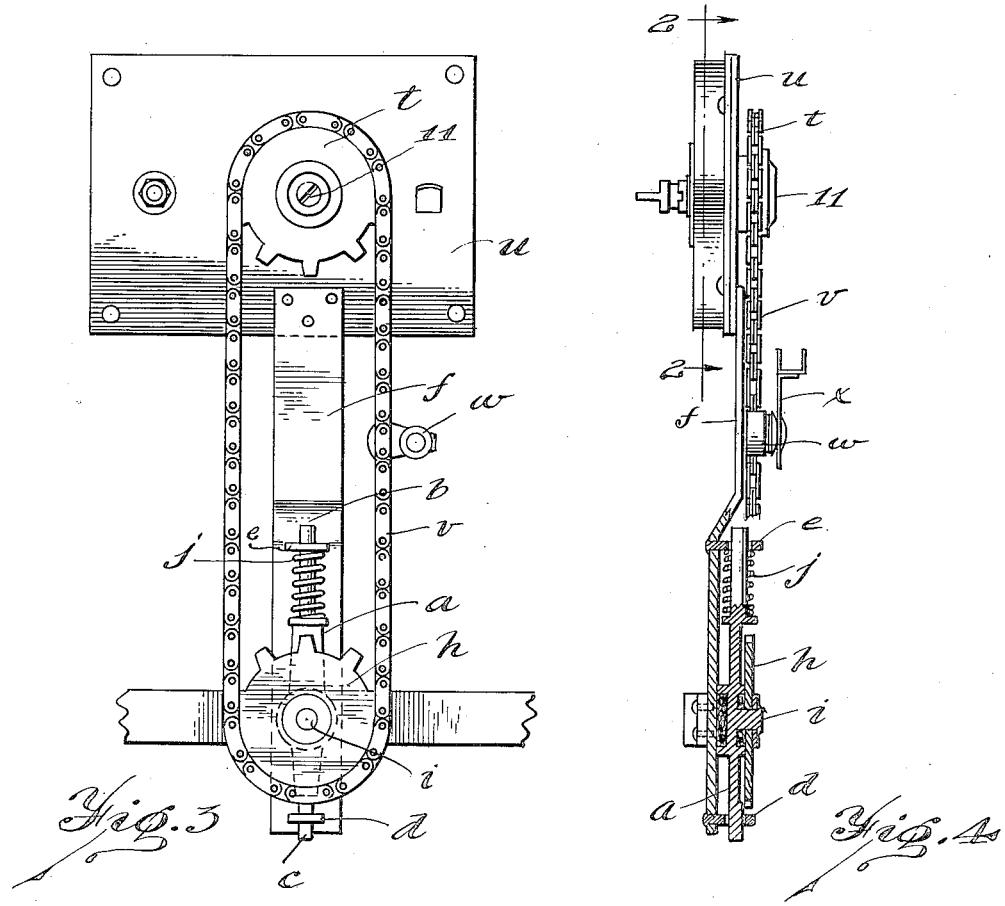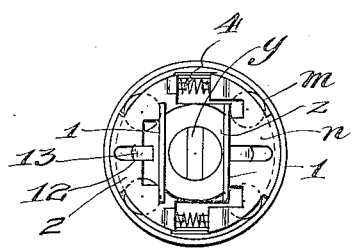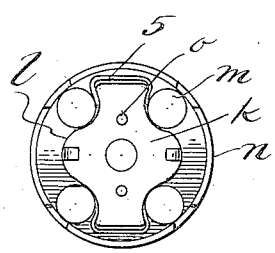

Patented Aug. 26, 1924.

1,506,177

UNITED STATES PATENT OFFICE.

ERNEST E. HEINTZ, OF DETROIT, MICHIGAN, ASSIGNOR TO TERNSTEDT MANUFACTURING COMPANY, OF DETROIT, MICHIGAN, A CORPORATION OF MICHIGAN.

CLUTCH.

Original application filed April 27, 1921, Serial No. 464,870. Divided and this application filed September 15, 1922. Serial No. 588,328.

*To all whom it may concern:*

Be it known that I, ERNEST E. HEINTZ, citizen of the United States, residing at Detroit, in the county of Wayne and State of Michigan, have invented certain new and useful Improvements in Clutches, of which the following is a specification.

This invention relates to clutches and is a division of application Serial No. 464,870 filed April 27, 1921 on window regulators. The clutch shown in the application referred to has, however, a broader application than shown in such application. The object of the present clutch is to provide an improved clutch of the type shown in the prior Simpson et al. Patent No. 1,343,410. A clutch of the type shown in this prior Simpson patent is a very quick acting clutch and will lock the slack in the chain when the window is stopped before the turning effort on the handle ceases. As explained in the application referred to, this is due to the fact that the chain tensioning spring will be collapsed causing one of the side runs of the chain to be tightened up and the other slackened.

It is the object of the present invention to provide a suitable driving device for the rolls or discs which will retard the locking action of the clutch. A further object of the invention is to provide yieldable driving devices which will take up the lost motion between the handle and the discs which would otherwise be present. This clutch may be used in other places than in window regulators as will be obvious. It could be used anywhere that it is desirable to drive a piece of machinery through certain designated driving members and where it is necessary to prevent "back" operation of the parts; that is, operation originating in the driven parts. This clutch is also useful in connection with window regulators in which the slack problem does not arise at all as for instance, a window regulator which has two permanently fixed sprocket wheels, for the reason that it cushions the lost motion which would otherwise exist between the clutch parts and the handle in a clutch of this type. This avoids the swinging and vibration of the handle.

It has been found desirable to show this clutch as used in a regulator but this is simply one of the environments in which the clutch may be found.

In the drawings:—

Fig. 3 is a side elevation showing the side of the window regulator opposite to that shown in Fig. 1.

Fig. 4 is a side elevation partly in section but taken at an angle of ninety degrees from the showing in Fig. 3.

Fig. 5 is a detail view of the clutch with the driving plates removed.

Fig. 6 is a view of the clutch with the driving plates assembled in place.

This window regulator is of the chain type shown in the prior patent to Lawrence and Allmand #1,317,150 dated Sept. 30, 1919. This patent describes the chain tensioning device, which comprises the lower sprocket support *a*, which has a pair of trunnion-like ends *b* and *c* that engage in riveted-on portions *e* and *d* of the vertical strap iron *f* that connects the upper and lower sprockets. The lower sprocket wheel *h* is journaled on a stud *i* projecting from this support *a*. This support *a* is projected downwardly by the coil spring *j* which constitutes a chain tensioning spring and ordinarily keeps the chain taut. By reason of the trunnion-like ends of the bearing support the lower sprocket may rock slightly to accommodate itself to the upper sprocket to prevent the chain from running off the sprocket teeth.

Figure 2:
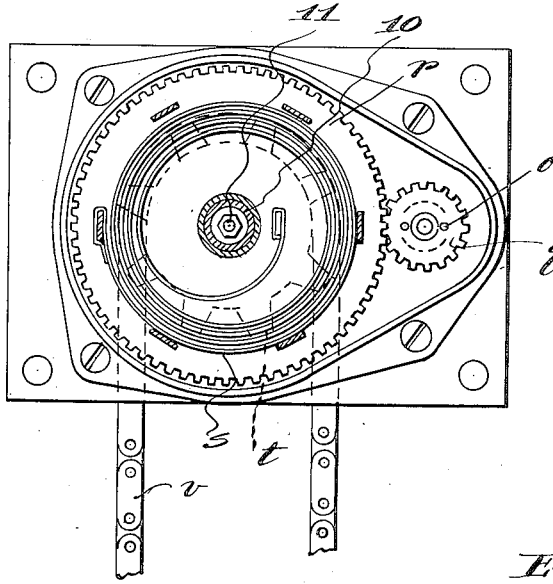
Fig. 2 is a section on the line 2—2 of Fig. 4.

In prior patent to Simpson, Schmidt and Carstens #1,343,410 of June 15, 1920, the main features of the clutch here shown are described and claimed. In that patent there is described and claimed a clutch which locks when the turning effort is applied from the driven parts of the window regulator but which is free to turn when the turning effort is applied from the driving parts of the regulator. To be more specific, *k* is a cam which is provided with inclines *l* so that, when the cam is turned in either direction by effort applied to the driven parts of the regulator, these inclines *l*, which are four in number, creep in under the disks *m* and jam these out against the wall of the clutch casing *n*. This effectively locks the clutch elements from any effort applied by the driven parts of the regulator, for the cam *k* is connected by the pins *o* with the pinion *q* (Fig. 2). This pinion *q* is in mesh with the larger gear *r* which engages under the counterbalancing spring *s*. This larger gear is connected by a suitable hollow spindle 10 and bolt 11 with a chain sprocket *t* (Fig. 3) on the opposite side of the upper supporting plate *u*. Around this upper sprocket, which is the driving sprocket, runs the chain *v*, which, as already explained, runs also over the lower sprocket *h*. The window lifting pin *w* is provided on one of the links of the chain to engage in a sash plate *x* in a familiar way that need not here be detailed.

Figure 1:
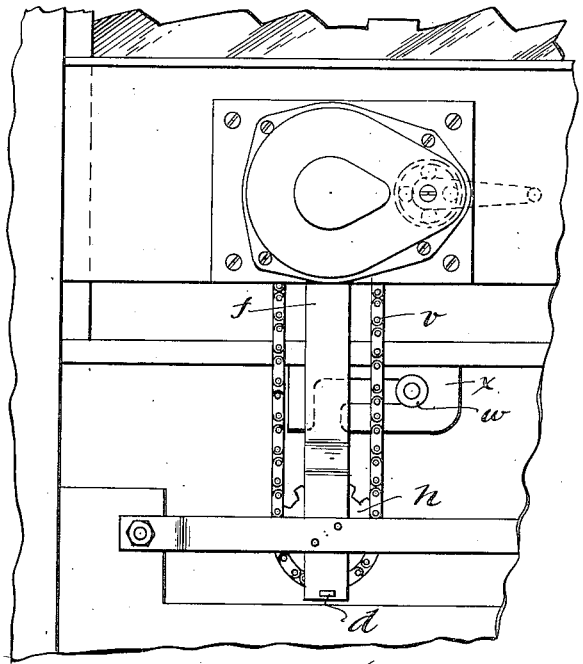
Fig. 1 is a side elevation showing the window regulator attached to the lock-board.
Figure 7:
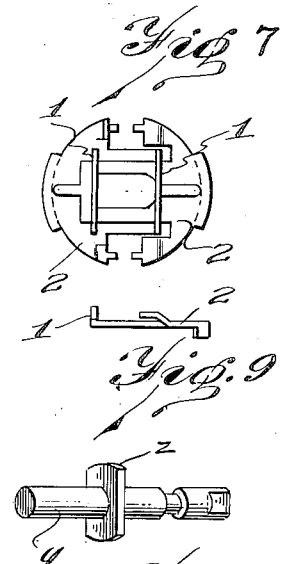
Fig. 7 is a view of the driving plates disassembled from the remaining clutch parts.
Figure 9:
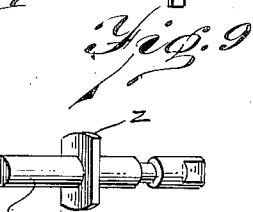
Fig. 9 is an edge view of one of the driving plates.
Figure 8:
Fig. 8 is a perspective of the operating spindle.

Now turning to Fig. 6, it will be seen that the operating spindle *y* (detailed in Fig. 8) is provided with an integral key *z* that fits between the flanges 1 on the two driving plates 2. The right hand flange 1 is attached to the left hand driving plate 2 and the left hand flange 1 is attached to the right hand driving plate 2 (see Fig. 7). Hence when turning effort is exercised on the spindle *y* the key *z* first spreads the flanges 1 and hence draws in the driving plates. Each of these driving plates is provided with a slot 12 which is guided on the struck-out lug 13 of the cam *k*. Hence the driving plates 2 can only move perpendicular to the major axis of the cam. Hence when turning effort is exercised upon the crank handle (which is part of the driving parts of the regulator) the driving plates hold the rolling members or disks *m* from being thrust out against the wall of the casing to lock the clutch. Of course, as long as the driving effort of the driving parts is greater than the resistance in the cam, there is no tendency for the clutch parts to lock. This is the action of the clutch described and claimed in the prior Simpson, Carstens and Schmidt patent, where no yieldable driving plates are used but a single solid driving plate.

The operation of some types of clutches and the clutch in the prior Simpson, Carstens and Schmidt patent is such that when a heavy resistance is met, as, for instance, when the chain tensioning spring becomes collapsed, then the cam will start rotating in the opposite direction immediately the dead point of resistance has been met and the effort on the handle falters in the least. Any movement of the cam reversely, although very small locks the clutch in the Simpson et al. clutch, thrusts the disks or locking pieces outward and locks the regulator. This, of course, leaves the one run of the chain slack.

The action of the composite driving plate which comprises the two driving plates and the springs 4 which tend to spread them, is as follows: The driving action due to the actuation by the driving parts of the regulator is substantially the same as in the Simpson, Carstens and Schmidt clutch. However, the flat springs 5 which engage over the ends of the cam yieldingly hold the disks or locking pieces always in contact with the driving plate and thereby avoid any objectionable clicking or noise. When the clutch parts reach a dead point of resistance as when the sash has reached the bottom of the well and the chain tensioning spring *j* has been completely collapsed, the operation of the clutch differs quite materially from the action of the previous clutch of the Simpson, Carstens and Schmidt patent. Assuming the exact dead point of resistance has been reached and turning effort on the handle falters or is released, now of course, the chain tensioning spring *j* tends to reversely rotate the same. This, as we have seen in the old Simpson, Carstens and Schmidt clutch, immediately locked the clutch. This is not so in this clutch for here the driving plates preclude any such locking until they have been spread. The reason for this is that the driving plates, by means of the slots 12 and the lugs or the keys 13, are tied to the cam to rotate with it. Hence the reverse movement of the cam simply tends to reversely rotate the driving plates or the composite driving plate. The locking disks or rolling members are simply carried along in a reverse direction but in no way projected out to lock the clutch parts. However, the turning effort having been released upon the crank handle and hence the key *z*, the small and weak springs 4 are free to bring back the flanges 1 against the sides of the key and at the same time spread the driving plates. When the driving plates are spread then the locking disks or rolling members are free to be thrust out. After they have been thrown out or thrust out by the ends of the springs 5, they meet friction on the inside of the casing and cease to rotate with the cam. The inclined surface *k* of the cam then drives in under the disk and locks the clutch parts by jamming the disks in between the cam and the cylindrical wall of the casing. Hence when no effort is exercised on the crank handle the driving plates are expanded and permit any movement in either direction of the cam to jam the inclines in under the balls and lock the clutch parts.

As I understand the action of this apparatus, the weak springs 4 that spread the driving plates act slower than the strong chain tensioning spring $j$. Consequently the spring $j$ snaps the chain back to its normal position before the driving plates release the clutch, permitting it to lock. The result is that this clutch never locks when there is slack in the chain due to the collapsing of the chain tensioning spring. The driving plates prevent this.

In the clutch shown in the prior Simpson et al. patent, lost motion has to be left between the rolls $m$ and the solid driving plate otherwise the parts could not function. This leaves the handle free to vibrate within a small arc. In the improved construction shown in Fig. 6, the driving plates are prevented from rotating independently of the cam $k$. Inasmuch as the cam $k$ is locked, the driving plates cannot rotate nor can they freely move transversely of the cam for the springs 4 hold the flanges $l$ against the flattened sides of the key $z$ hence the regulator handle can only be moved by overcoming resistance of the springs 4. Consequently, these springs are sufficient to cushion the lost motion and prevent the regulator handle vibrating under the motion of the car.

What I claim is:

1. A clutch, having in combination, a cylindrical casing, a cam rotatably supported therein and arranged for connection with the driven parts, a plurality of rotatable members supported about said clutch in proximity to the cylindrical casing, and a driving plate for engaging the said rotating members when the clutch parts are actuated by the driving parts and springs for yieldingly forcing said rotating members against the driving plate, said cam being shaped to thrust the rotating members into locking arrangement with the casing when any reverse actuation occurs from the driven parts.

2. A clutch, having in combination, a cylindrical casing, a cam rotatably supported in the casing, a plurality of rotating members secured about the cam in proximity to the interior of the casing, and driving means for engaging the rotating members when actuation is from the driving parts the said cam adapted for connection with the driven parts and arranged to thrust the rotating members into locking engagement with the cylindrical casing when actuation is attempted from the driven parts, the said driving means, however, being provided with devices for retarding the clutch locking.

3. A clutch, having in combination, a cylindrical casing, a cam rotatably supported therein, a plurality of rotating members supported about the cam in proximity to the clutch casing, a pair of driving plates yieldingly expanded outwardly and arranged to engage the rotating members to drive the clutch parts freely when effort is applied through the driving parts and means for driving the said plates which initially causes the driving plates to contract and hold the rotating members from being projected outwardly by the cam into locking relation with the cylindrical casing, the said cam being arranged when no driving effort is being exercised through the driving means to thrust the rotating members into locking relation with the cylindrical casing when effort is applied to the cam through the driven parts.

4. A clutch, having in combination, a cylindrical casing, a cam rotatably supported therein, a plurality of rotating members engaging between the cam and the casing adapted to be projected into locking relation with the casing when effort is applied to the cam through the driven parts and a yieldable multiple part contractible driving plate by which the rotating members and the cam can be rotated freely when driving effort is applied through the driving plate from the driving parts of the regulator.

5. A clutch, having in combination, a cylindrical casing, a cam rotatably supported therein, a plurality of rotating members supported between the cam and the cylindrical casing and arranged to be projected in locking relation with the casing when the cam is actuated through the driven parts, a pair of driving plates, springs tending to separate the said driving plates, each of the driving plates provided with a flange on the side of the center of the cylindrical casing remote from which the main body of the plate is located, and an operating spindle provided with a key adapted to engage between the two flanges which are yieldingly pressed against the side of the key by the springs of the driving plates.

6. A clutch, having in combination, a cylindrical casing, a cam rotatably supported within the casing and provided with four recesses, four disks distributed in said recesses and engaging between the cam and the cylindrical walls of the casing, said cam being provided with inclines on one side of the recesses to drive the disks into locking engagement with the cylindrical casing when effort is applied to the cam through the driven parts, a pair of driving plates arranged to slide crosswise of the cam and provided with lips adapted to engage between the pairs of disks, each of the driving plates provided with a flange located on the side of the center of the casing remote from the side where the main body of the plate lies, springs for yieldingly spacing said plates, and an operating spindle provided with a key adapted to engage between said plate flanges whereby the key in rotation will first contract the driving plates against the disks so that the clutch parts may rotate freely as long as sufficient effort is applied through the key.

7. In a clutch the combination of driving members and driven members including rolls which jam when actuation comes through the driven members, the said driving members including a crank and driving plates having cushioned connections which prevent the crank vibrating due to lost motion.

ERNEST E. HEINTZ.